(12) United States Patent
Bannai et al.

(10) Patent No.: US 8,611,363 B2
(45) Date of Patent: Dec. 17, 2013

(54) LOGICAL PORT SYSTEM AND METHOD

(75) Inventors: Vinay Bannai, Sunnyvale, CA (US);
Theodora Karali, Mountain View, CA (US); Peter Geoffrey Jones, Campbell, CA (US); Jacqueline M. Zoucha, Sunnyvale, CA (US); Arun Sastry, Palo Alto, CA (US)

(73) Assignee: Adtran, Inc., Huntsville, AL (US)

( * ) Notice: Subject to any disclaimer, the term of this patent is extended or adjusted under 35 U.S.C. 154(b) by 1564 days.

(21) Appl. No.: 10/140,308

(22) Filed: May 6, 2002

(65) Prior Publication Data

US 2003/0206548 A1 Nov. 6, 2003

(51) Int. Cl.
*H04L 12/28* (2006.01)

(52) U.S. Cl.
USPC ............ 370/409; 370/392; 370/469; 709/238

(58) Field of Classification Search
USPC ................... 370/389, 400; 709/223
See application file for complete search history.

(56) References Cited

U.S. PATENT DOCUMENTS

| | | |
|---|---|---|
| 4,663,748 A | 5/1987 | Karbowiak et al. |
| 4,698,804 A | 10/1987 | Flores et al. |
| 5,311,585 A | 5/1994 | Armstrong et al. |
| 5,333,130 A | 7/1994 | Weissmann et al. |
| 5,398,236 A | 3/1995 | Hemmady et al. |
| 5,636,205 A | 6/1997 | Suzuki et al. |
| 5,721,819 A | 2/1998 | Galles et al. |
| 5,790,523 A | 8/1998 | Ritchie et al. |
| 5,793,745 A | 8/1998 | Manchester |
| 5,978,378 A | 11/1999 | Van Seters et al. ........... 370/401 |
| 6,011,780 A | 1/2000 | Vaman et al. |
| 6,047,331 A | 4/2000 | Medard et al. |
| 6,094,582 A | 7/2000 | Zimmermann |
| 6,122,759 A | 9/2000 | Ayanoglu et al. |
| 6,226,296 B1 | 5/2001 | Lindsey et al. |
| 6,229,788 B1 | 5/2001 | Graves et al. |
| 6,236,640 B1 | 5/2001 | Klink |
| 6,269,452 B1 | 7/2001 | Daruwalla et al. |
| 6,292,464 B1 | 9/2001 | Elahmadi et al. |
| 6,304,347 B1 | 10/2001 | Beine et al. |
| 6,305,019 B1 | 10/2001 | Dyer et al. |
| 6,343,081 B1 | 1/2002 | Blanc et al. |
| 6,400,681 B1 | 6/2002 | Bertin et al. |

(Continued)

FOREIGN PATENT DOCUMENTS

| | | |
|---|---|---|
| EP | 0843360 | 5/1998 |
| EP | 0901169 | 3/1999 |

(Continued)

OTHER PUBLICATIONS

ISSCC 200/Feb. 8, 2000/Salon 1-6—Digest of Technical Papers.

(Continued)

*Primary Examiner* — Chi Pham
*Assistant Examiner* — Mohammad Adhami
(74) *Attorney, Agent, or Firm* — Sawyer Law Group, P.C.

(57) ABSTRACT

Logical ports allow multiple customers to be connected to and to receive different services over a common physical port of a packet forwarding device. Such logical ports allow for customer separation and may be created based on VLAN ID and MPLS labels. In one embodiment, each service provided via a packet forwarding device is associated with a unique logical port. The logical port may span multiple physical ports.

13 Claims, 3 Drawing Sheets

(56) References Cited

U.S. PATENT DOCUMENTS

| | | |
|---|---|---|
| 6,426,947 B1 | 7/2002 | Banker et al. |
| 6,557,112 B1 | 4/2003 | Shimada |
| 6,639,896 B1 | 10/2003 | Goode et al. |
| 6,647,428 B1 * | 11/2003 | Bannai et al. ............... 709/245 |
| 6,788,681 B1 * | 9/2004 | Hurren et al. ............... 370/389 |
| 6,931,002 B1 * | 8/2005 | Simpkins et al. ............ 370/354 |
| 6,965,592 B2 | 11/2005 | Tinsley et al. |
| 6,973,026 B1 * | 12/2005 | Dyrga et al. ................ 370/218 |
| 7,065,089 B2 * | 6/2006 | Kuhl et al. ................ 370/395.2 |
| 7,068,654 B1 | 6/2006 | Joseph et al. |
| 7,079,544 B2 * | 7/2006 | Wakayama et al. ........... 370/401 |
| 7,154,861 B1 * | 12/2006 | Merchant et al. ............ 370/254 |
| 7,254,138 B2 | 8/2007 | Sandstrom |
| 7,269,185 B2 * | 9/2007 | Kirkby et al. ................ 370/469 |
| 7,327,757 B2 * | 2/2008 | Ghahremani et al. ........ 370/466 |
| 7,668,166 B1 | 2/2010 | Rekhter et al. |
| 2002/0027906 A1 * | 3/2002 | Athreya et al. .............. 370/386 |
| 2002/0085553 A1 | 7/2002 | Ku et al. |
| 2002/0114031 A1 | 8/2002 | Yamada |
| 2002/0176371 A1 | 11/2002 | Behzadi |
| 2002/0176373 A1 | 11/2002 | Sato |
| 2002/0176450 A1 * | 11/2002 | Kong et al. .................. 370/539 |
| 2003/0009599 A1 | 1/2003 | Lee et al. |
| 2003/0026209 A1 | 2/2003 | Katz |
| 2003/0110268 A1 * | 6/2003 | Kermarec et al. ............ 709/227 |
| 2003/0118019 A1 | 6/2003 | Mark et al. |
| 2003/0120763 A1 * | 6/2003 | Volpano ....................... 709/223 |
| 2003/0123449 A1 * | 7/2003 | Kuhl et al. ................ 370/395.1 |
| 2003/0147393 A1 | 8/2003 | Stewart |
| 2003/0152075 A1 * | 8/2003 | Hawthorne et al. .......... 370/389 |
| 2003/0152182 A1 | 8/2003 | Pai et al. |
| 2003/0154315 A1 | 8/2003 | Sultan et al. |
| 2003/0165146 A1 | 9/2003 | Sultan et al. |
| 2004/0032856 A1 | 2/2004 | Sandstrom |
| 2005/0259571 A1 | 11/2005 | Battou |
| 2006/0034292 A1 | 2/2006 | Wakayama et al. |
| 2011/0206057 A1 * | 8/2011 | Rekhter ....................... 370/409 |

FOREIGN PATENT DOCUMENTS

| | | |
|---|---|---|
| EP | 0908954 | 4/1999 |
| EP | 1 024 642 A2 | 8/2000 |
| WO | WO9508190 | 3/1995 |
| WO | WO0070622 | 11/2000 |
| WO | WO02093830 | 11/2002 |

OTHER PUBLICATIONS

Kazuo Nakazato, et al., "PLED—Planar Localised Electron Devices," 1997, IEEE.

MMC Networks, "EPIF 4-L3 Reference Manual," MMC 97/0030, Issue 1.0, pp. i-viii, 1-1 to 1-6, 2-1 to 2-16, and 3-1 to 3-16, Oct. 1998.

MMC Networks, "AnyFlow 5400 Product Overview", 3 pages.

MMC Networks, EPIF4-L3C1 Ethernet Port L3 Processor, MMC Networks, Inc., MMC 98/0066, Issue 1.0, pp. 1-37, 1998.

MMC Networks, XPIF-300A3/XPIF-300A3-50 Gigabit BitStream Processor, MMC 99-0046, Issue 0.91, pp. 1-64, 1999.

* cited by examiner

LOGICAL PORT SYSTEM AND METHOD

CROSS-REFERENCE TO RELATED APPLICATION

This patent application relates to commonly-assigned U.S. patent application Ser. No. 10/140,234, entitled "System and Method for Providing Transparent LAN Services" filed on even date herewith, the disclosure of which is hereby incorporated by reference in its entirety.

TECHNICAL FIELD

The present invention relates to communication networks, and in particular to a logical port system and method.

BACKGROUND

Network packet forwarding devices, such as routers, switches, multiplexers, and the like include a limited number of physical ports to which customers may connect. Different customers typically connect to different physical ports of a packet forwarding device. In addition, different services are typically provided to a given customer over different physical ports.

For example, a given customer may receive routing services over one physical port of the packet forwarding device and the same customer may receive TDM (time division multiplexing) services over another physical port of the packet forwarding device. Hence, given a limited set of physical ports of a packet forwarding device, the packet forwarding device is limited in the number of different services and/or customers the packet forwarding device may support.

Accordingly, a need exists to provide a system and method for increasing port density at a packet forwarding device. Another need exists to provide a system and method for providing an increased number of services or providing services to an increased number of customers over a given set of ports of a packet forwarding device.

SUMMARY

In general, the present system and method alleviate port density and permit a greater number of services to be provided over a given set of physical ports by creating logical ports. Incoming data packets on a physical port may include a VLAN ID or an MPLS (Multi-Protocol Label Switching) label. The packet forwarding device assigns the incoming data packets to a specific logical port according to the VLAN ID or the MPLS label of the incoming data packet. The packet forwarding device may also assign a specific service to each logical port. Further, different customers may be assigned separate logical ports and be connected to a common physical port.

In addition, a given logical port may include more than one physical port and may span multiple physical ports on the same slot, physical ports on different slots, or physical ports on different packet forwarding devices.

Further, each logical port may include SLA (Service Level Agreements) or QoS (Quality of Service) associated with the logical port, thereby permitting different QoS to be provided to different logical ports on the same or different physical ports. Accordingly, according to some embodiments of the present invention, each service is associated with a logical port.

A logical port is used to identify and manage multiple sets of flows across a single interface. The logical port provides a common set of abstractions that can support delivery of a variety of services, allowing the variety of services to share common lower level mechanisms. In one embodiment, the logical port comprises one of a number of interfaces on a physical interface, such as a physical port.

Logical ports may have a one-to-one mapping to services, such that each logical port supports either a different type of service or services for different customers. Thus, a single customer may have multiple logical ports supporting multiple associated services. Higher-level services can use logical ports as a way to gather statistics on a logical port basis.

A logical port defines a group of packets according to certain pre-defined criteria. The logical ports behave similar to a physical port in terms of traffic service. The logical ports permit multiple customers to be connected to a single physical port of a node. The logical ports also permit different services to be provided to a customer over a single physical port. Thus, the logical ports help alleviate port density problems.

Additional details regarding the present system and method may be understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
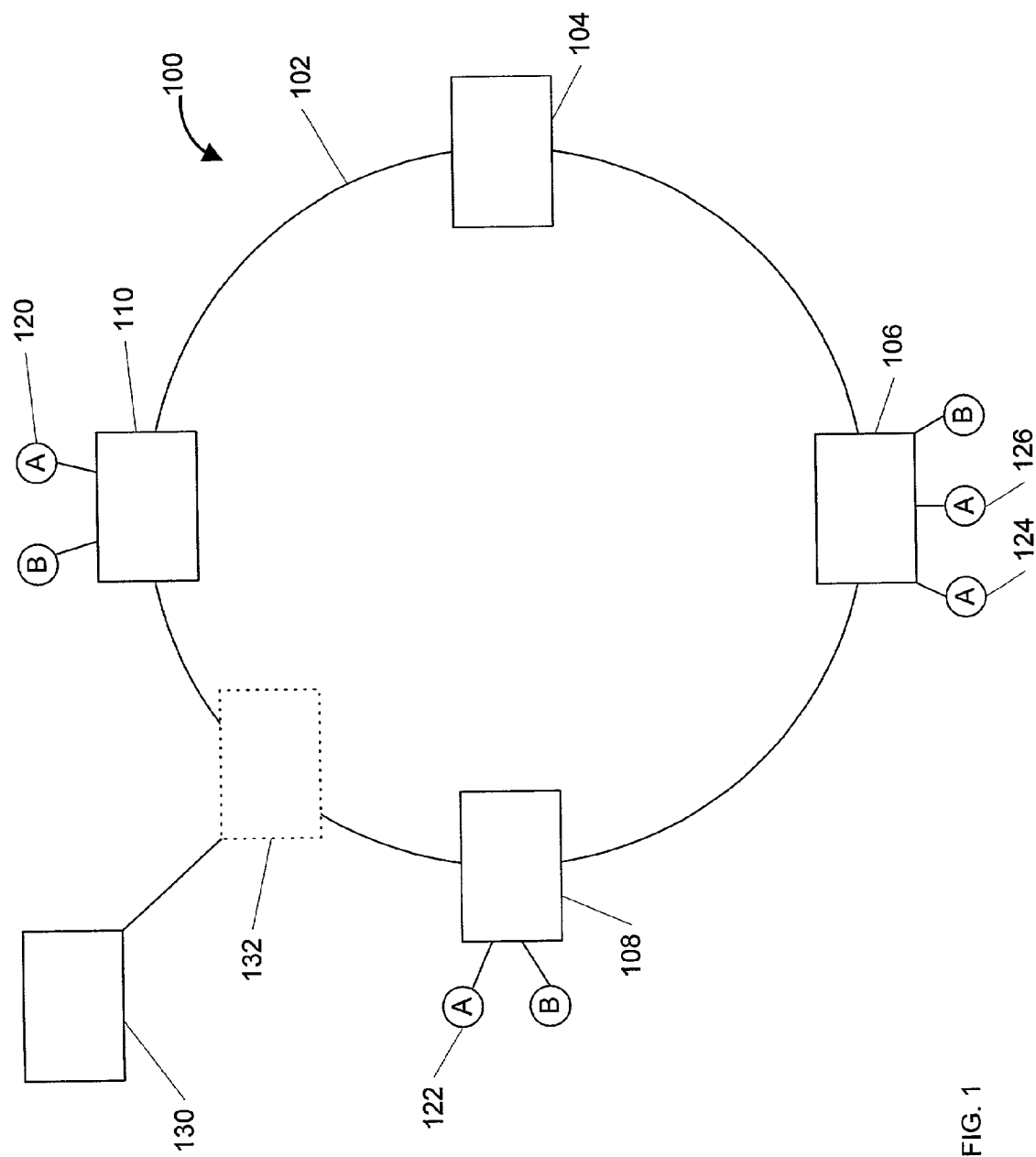
FIG. 1 illustrates a communication network in accordance with an embodiment of the present invention.

FIG. 1 illustrates a network 100 in accordance with one embodiment of the present invention. As shown, the network 100 includes a ring 102, which interconnects nodes 104, 106, 108, 110. In one embodiment, the ring 102 may comprise a fiber optic ring having a Resilient Packet Ring (RPR) topology. In some applications, the network 100 may comprise a metro area network (MAN). Each of the nodes 104-110 may comprise a high speed routing/multiplexing device. Details of the nodes are described below and in U.S. patent application Ser. No. 09/518,956, the disclosure of which is hereby incorporated by reference in its entirety.

The network 100 has locations, or sites, of customer A and customer B connected thereto. As illustrated, customer A has multiple locations 120, 122, 124, and 126. Each of these locations may comprise a LAN. The location 120 is connected to node 110, the location 122 is connected to node 108, and locations 124, 126 are connected to node 106.

In one embodiment, node 110 provides multiple services to customer A at location 120 over a single physical port of the node 110 using a logical port system and method. The node inspects incoming data packet received by the node over the single physical port and identifies a logical port identifier within data packet. Pursuant to one embodiment, the logical port identifier comprises an MPLS label associated with a logical port. Pursuant to another embodiment, the logical port identifier comprises a VLAN ID (Virtual Local Area Network Identifier). The node then uses a lookup table to identify, or determine, the logical port associated with the packet. The node then assigns a service to the packet based on the logical port to which it is assigned.

In another embodiment, nodes 108, 110 provide a single service to customer A at locations 120, 122 over a physical port of the node 110 and a physical port of the node 108 using a logical port system and method. The nodes 108, 110 each inspect incoming data packets received by the nodes 108, 110 over respective physical ports and identify the logical port identifier within each data packet. As discussed above, the logical port identifiers may comprise MPLS labels or VLAN IDs. The nodes 108, 110 then each use a lookup table to identify, or determine, the logical port associated with the packet. In this embodiment, the incoming data packets include identical logical port identifiers and are thus assigned to the same service for the same customer, namely, customer A.

A management console 130 may also be connected to the ring 102 by a node 132. The management console 130 is used to permit network management and provisioning of the devices connected to the ring 102 as described in more detail below. In particular, the management console 130 may be used to access individual nodes 104-110 to establish logical ports thereon.

Several applications exist for the present system and method. For example, with respect to the provision of layer 1 services, the logical port may be used to setup cross connects for wire mode transports. This allows multipoint to point physical port aggregation and de-aggregation based on logical ports. Services such as Ethernet private lines (EPL), virtual leased lines (VLL), and circuit emulation services (CES), are examples of this type of service. In wire mode, MPLS label based logical ports provide layer 1 services.

With respect to the provision of layer 2 services, the logical support functions as if a physical port were set in a TLS (Transparent LAN Services) mode. Packets incoming on the logical port interface would be switched based on the layer 2 destination MAC Address. This provides aggregation and de-aggregation service at layer 2. Thus, traffic may be aggregated using logical ports for each domain. Additional details regarding TLS mode are disclosed in U.S. Patent Application entitled "System and Method for Providing Transparent LAN Services" filed on even date herewith and incorporated herein by reference above.

With respect to the provision of layer 2.5 services, the logical port functions to support aggregation and de-aggregation services using MPLS labels. The MPLS label of an incoming packet is examined to forward the data packet. It is to be noted that the MPLS label ranges may also be used to specify logical ports for offering layer 1 services. The mode of the logical port determines whether it forwards using layer 1 or layer 2.5.

With respect to layer 3 services, a logical port would support aggregation and de-aggregation using layer 3 header information. In this mode, also referred to as routing mode, incoming packets are routed based on the destination IP address of each incoming packet.

Figure 2:
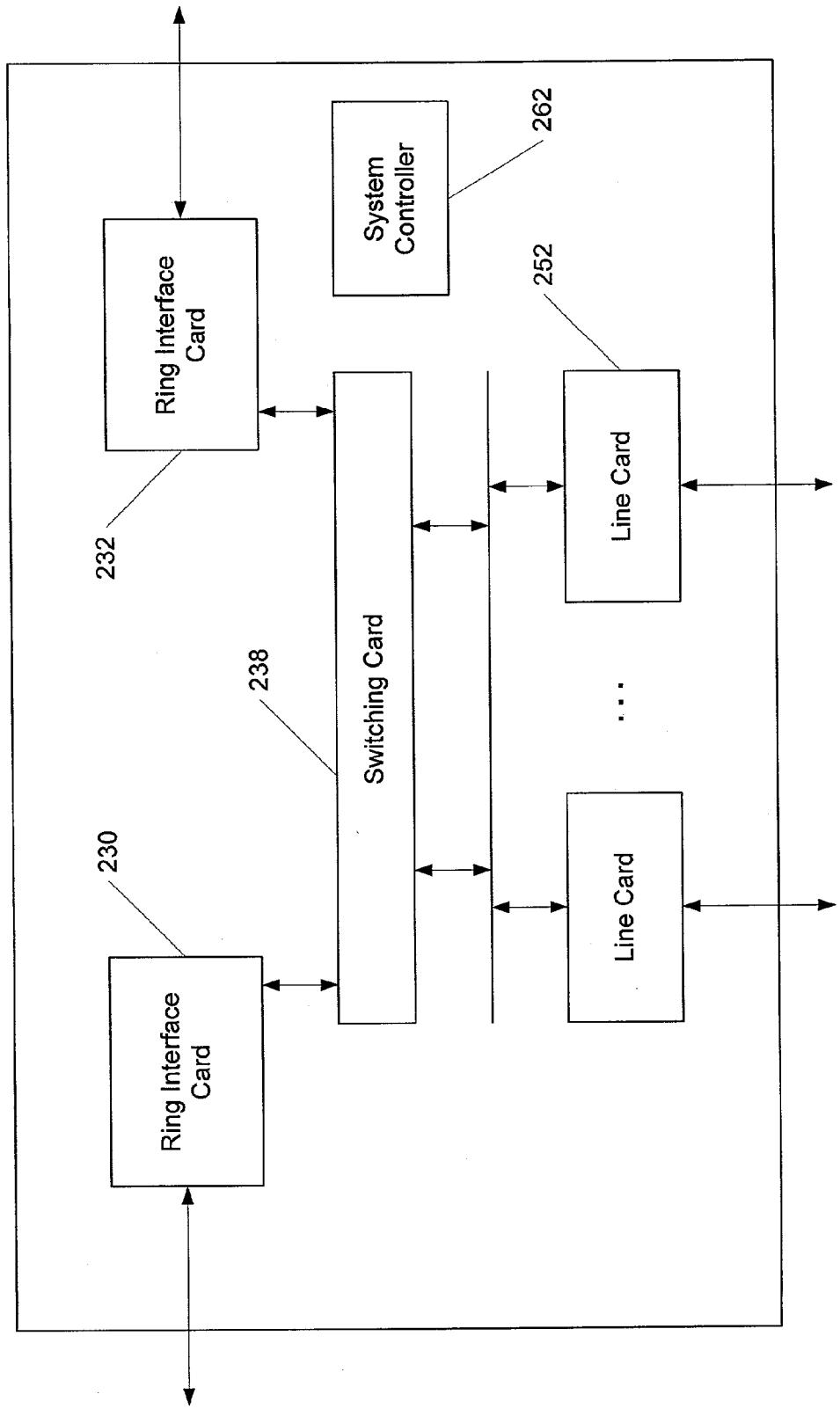
FIG. 2 illustrates details of a FIG. 1 node in accordance with an embodiment of the present invention.

FIG. 2 illustrates details of one of the nodes of FIG. 1, which may be similarly configured. Node 108 is shown as an example. As illustrated, the node 108 includes ring interface cards 230 and 232, a switching card 238, line cards 252, and a system controller 262. The ring interface cards 230 and 232 convert the incoming optical signals on fiber optic cables 234 and 236 to electrical digital signals for application to switching card 238. In one embodiment, the ring interface cards 230, 232 may be implemented as a single card. Additional details regarding the ring interface cards 230 and 232 and the node 108 are disclosed in U.S. patent application Ser. No. 09/519,442, entitled "Dynamically Allocated Ring Protection and Restoration Technique" filed Mar. 3, 2000, the disclosure of which is hereby incorporated by reference in its entirety.

Figure 3:
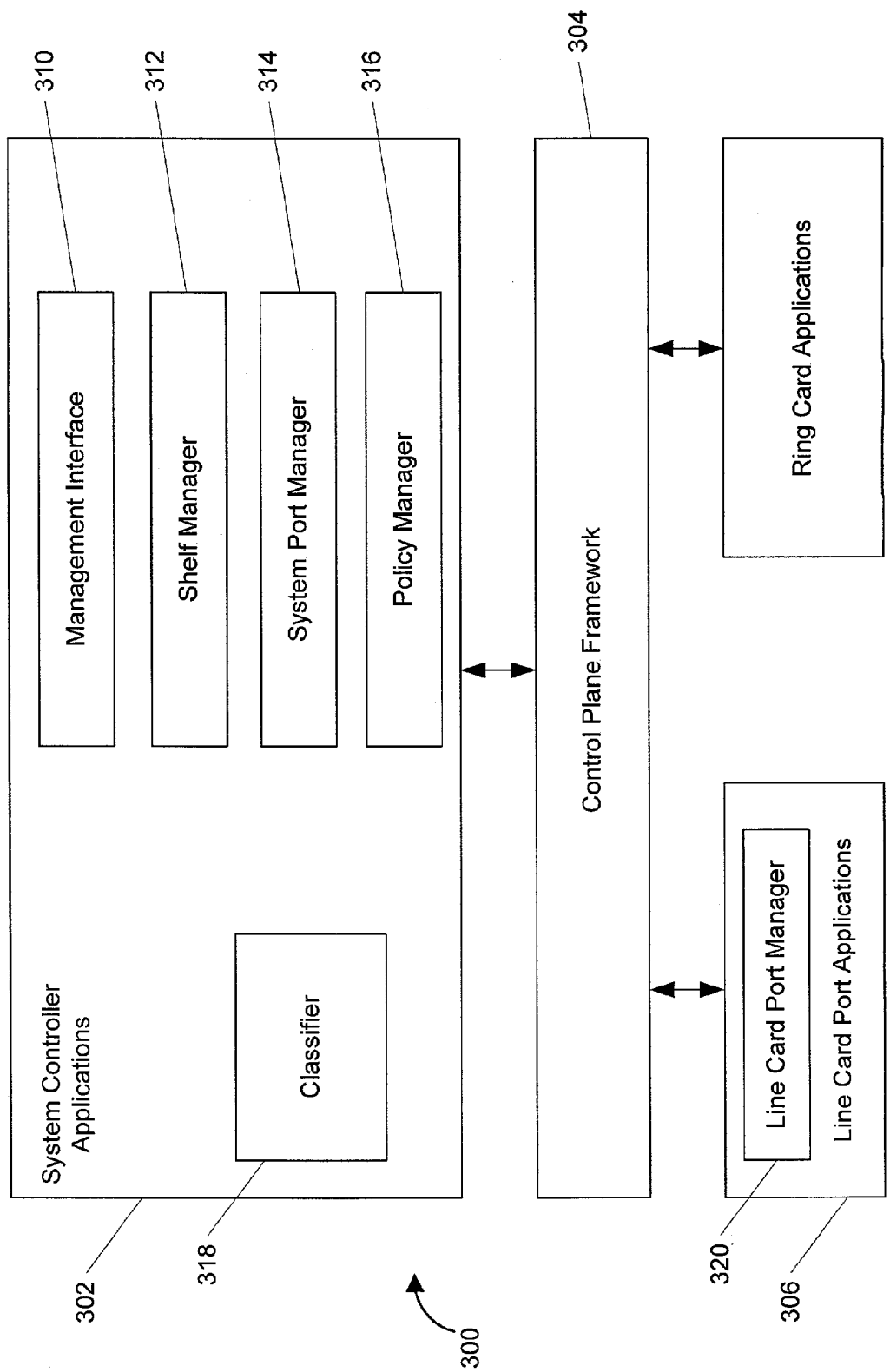
FIG. 3 is a functional diagram illustrating system architecture.

FIG. 3 is a functional diagram 300 illustrating system architecture. The functional diagram 300 includes system controller applications 302, a control plane framework 304, and line card applications 306. The system controller applications 302 may run on the system controller 262 of FIG. 2 and include the following modules: a management interface 310, a shelf manager 312, a system port manager 314, a policy manager 316, and a classifier 318.

In general, the classifier 318 verifies the configuration of the newly-created logical port and downloads necessary information (e.g., vlan_id or mpls label, port mode, actions to be taken for incoming/outgoing packets on the specified logical port) to the associated line card(s).

The management interface 310 may comprise a graphical user interface (GUI) based interface that permits a user at the management console 130 (FIG. 1) to remotely configure, monitor, and manage the associated node. The shelf manager 312 receives data from the management interface 310, stores the information for persistency, and forwards the information to the system port manager 314. The system port manager 314 handles the creation and the management of a logical port. The system port manager 314 specifies the mode, the administrative state, the IP address, and the MAC address of the logical port and communicates with the classifier 318.

The shelf manager 312 provides the interface to management of the system or node resources. The resources may include the cards, ports and configuration information.

The system port manager 314 provides a uniform abstraction for managing port behavior across various line card interfaces.

The classifier 318 and policy manager 316 manage the information related to creation of logical ports and the actions associated with them. The policy manager 316 in addition also handles the communication between the switching card 238 and the line cards 252.

The shelf manager 312 on receipt of a request for creation/deletion of a logical port from the management interface 310, initiates actions to interact with the classifier 318 and port manager 314 to create/delete the logical port. The shelf manager 312 also stores/deletes the information related to the logical port in a persistent database (not shown).

The policy manager 316 in turn initiates a set of actions that get communicated to the line card port manager 320 of each line card 252 (FIG. 2) to provision the logical port at the ingress of the physical ports. The policy manager 316 also handles the policy rules applied on a logical port. The policy manager 316 is responsible for storing/restoring policy rules from the database (not shown) and interacts with the classifier 318 to download policy applied on a logical port.

Accordingly, a logical port may be established by a user at the management console 130 (FIG. 1) by accessing the management interface 310 (FIG. 3). Then, using the management interface 310 the user may request a new logical port. In establishing a new logical port, the management interface 310 receives a request for a new logical port from the user. The request may include specification of whether the logical port is to be MPLS label based, or VLAN ID based, and may specify the physical port over which the logical port will be provided. The request may also include specification of data rate limits associated with the logical port. The management interface 310 then forwards this information to the shelf manager 312, which provides this information to other of the system controller modules. Lastly, this information is downloaded to a line card manager 320 for control of the associated line card.

The new logical port is then provisioned via the management interface 310. To provision the new logical port, a user at the management console 130 (FIG. 1) then specifies a customer, a service, and a quality of service (QoS) for the new logical port. At this point, the new logical port is established and provisioned.

The above-described embodiments of the present invention are meant to be merely illustrative and not limiting. Thus, those skilled in the art will appreciate that various changes and modifications may be made without departing from this invention in its broader aspects. Therefore, the appended claims encompass all such changes and modifications as fall within the scope of this invention.

What is claimed is:

1. A method of providing multiple services over a single physical port of a packet forwarding device, the method comprising:
   receiving a request for a new logical port, wherein the request includes the physical port over which the new logical port is to be provided, data rate limits associated with the logical port, and whether the new logical port is to be MPLS label based or VLAD ID based;
   provisioning and establishing the new logical port by specifying a customer, a service, and a quality of service for the new logical port;
   providing a set of logical ports, wherein the set of logical ports includes the new logical port, wherein each logical port of the set of logical ports includes one of a plurality of interfaces of a physical port;
   providing a lookup table associating a set of logical port identifiers with the set of logical ports, wherein each logical port of the set of logical port is associated with one of a plurality of services;
   receiving at least a first and a second incoming packet at the single physical port, wherein the first incoming packet includes a first logical port identifier and the second incoming packet includes a second logical port identifier, wherein the second logical port identifier is different from the first logical port identifier;
   assigning a first logical port of the set of logical ports to the first incoming packet using the lookup table and assigning a second logical port of the set of logical ports to the second incoming packet using the lookup table, wherein the first logical port is associated with a first service and the second logical port is associated with a second service of a different type from the first service; and
   forwarding the first incoming packet from the packet forwarding device in accordance with the first service and forwarding the second incoming packet from the packet forwarding device in accordance with the second service.

2. The method of claim 1, wherein the logical port identifiers each comprise a VLAN ID (Virtual Local Area Network Identifier).

3. The method of claim 1, wherein the logical port identifiers each comprise an MPLS (Multi-Protocol Label Switching) label.

4. The method of claim 1, wherein the first service is provided to a first customer and the second service is provided to a second customer.

5. The method of claim 1, wherein:
   the first logical port is further associated with a first QoS (Quality of Service);
   the second logical port is further associated with a second QoS (Quality of Service) that is different from the first QoS (Quality of Service); and
   forwarding the first incoming packet and the second incoming packet includes forwarding the first incoming packet and the second incoming packet through the physical port of the packet forwarding device using a different QoS (Quality of Service).

6. A packet forwarding device operable to forward packets in a network, the packet forwarding device including:
   a management interface receiving a request for a new logical port, wherein the request includes the physical port over which the new logical port is to be provided, data rate limits associated with the logical port, and whether the new logical port is to be MPLS label based or VLAD ID based;
   the management interface provisioning and establishing the new logical port by specifying a customer, a service, and a quality of service for the new logical port;
   a set of logical ports, wherein the set of logical ports includes the new logical port, wherein each logical port of the set of logical ports includes one of a plurality of interfaces of a physical port;
   a lookup table associating a set of logical port identifiers with the set of logical ports, wherein each logical port of the set of logical ports is associated with one of a plurality of services;
   a physical port to receive at least a first and a second incoming packet, wherein the first incoming packet includes a first logical port identifier and the second incoming packet includes a second logical port identifier, wherein the second logical port identifier is different from the first logical port identifier; and
   the physical port to assign a first logical port of the set of logical ports to the first incoming packet using the lookup table and to assign a second logical port of the set of logical ports to the second incoming packet using the lookup table, wherein the first logical port is associated with a first service and the second logical port is associated with a second service of a different type from the first service;
   wherein the packet forwarding device forwards the first incoming packet within the network in accordance with the first service and forwards the second incoming packet within the network in accordance with the second service.

7. The packet forwarding device of claim 6, wherein the logical port identifiers each comprise a VLAN ID (Virtual Local Area Network Identifier).

8. The packet forwarding device of claim 6, wherein the logical port identifiers each comprise an MPLS (Multi-Protocol Label Switching) label.

9. The packet forwarding device of claim 6, wherein the first service is provided to a first customer and the second service is provided to a second customer.

10. The packet forwarding device of claim 6, wherein:
    the first logical port is further associated with a first QoS (Quality of Service);
    the second logical port is further associated with a second QoS (Quality of Service) that is different from the first QoS (Quality of Service); and
    the packet forwarding device forwards the first incoming packet and the second incoming packet through the physical port using a different QoS (Quality of Service).

11. A communication network including the packet forwarding device of claim 6.

12. The communication network of claim 11, wherein the communication network comprises a communication network having a Resilient Packet Ring (RPR) topology.

13. The communication network of claim 11, wherein the communication network comprises a metro area network (MAN).

* * * * *